United States Patent
Muenger

[15] 3,666,682
[45] May 30, 1972

[54] WATER-GAS SHIFT CONVERSION PROCESS

[72] Inventor: James R. Muenger, Beacon, N.Y.
[73] Assignee: Texaco Inc., New York, N.Y.
[22] Filed: Nov. 26, 1969
[21] Appl. No.: 880,254

[52] U.S. Cl. .............................................. 252/373, 23/213
[51] Int. Cl. ............................................................. C01b 2/06
[58] Field of Search .................................... 258/373; 23/213

[56] References Cited

UNITED STATES PATENTS

| | | | |
|---|---|---|---|
| 1,173,417 | 2/1916 | Ellis | 23/213 |
| 2,747,967 | 5/1956 | Markert et al. | 23/213 X |
| 3,128,163 | 4/1964 | Weittenhiller et al. | 23/213 X |
| 3,303,001 | 2/1967 | Dienes | 23/213 |
| 3,355,249 | 11/1967 | Squires | 23/213 |
| 3,499,797 | 3/1920 | Hooper | 23/13 |
| 1,932,247 | 10/1933 | Kniskern | 23/289 |
| 2,829,113 | 4/1958 | Barry et al. | 23/213 UX |
| 3,466,152 | 9/1969 | Yamanota et al. | 23/289 |

FOREIGN PATENTS OR APPLICATIONS 1,575,915   7/1969   France.....................................23/212

Primary Examiner—Howard T. Mars
Attorney—Thomas H. Whaley and Carl G. Ries

[57] ABSTRACT

A water-gas shift conversion process in which a feed gas mixture is subjected to successive contacts with catalyst and the temperature of the reacting gases contacting the shift conversion catalyst is controlled by indirect concurrent heat exchange with the feed gas mixture.

10 Claims, 2 Drawing Figures

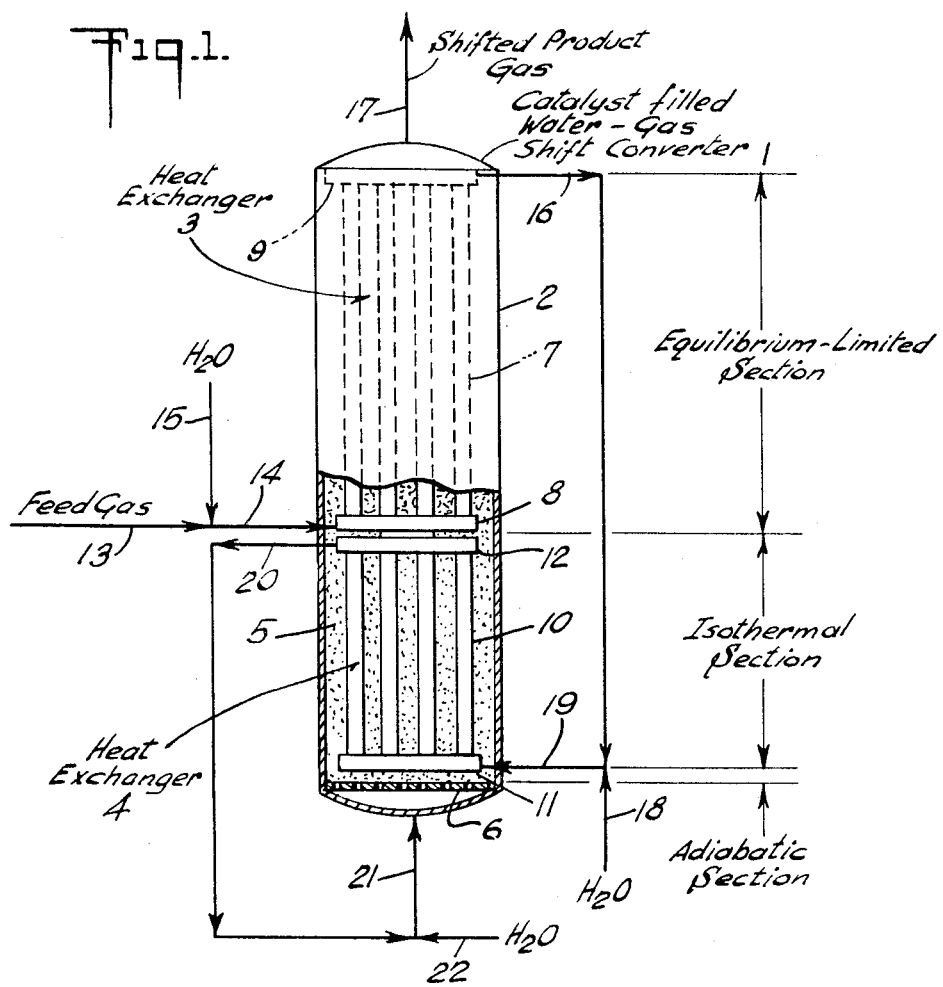
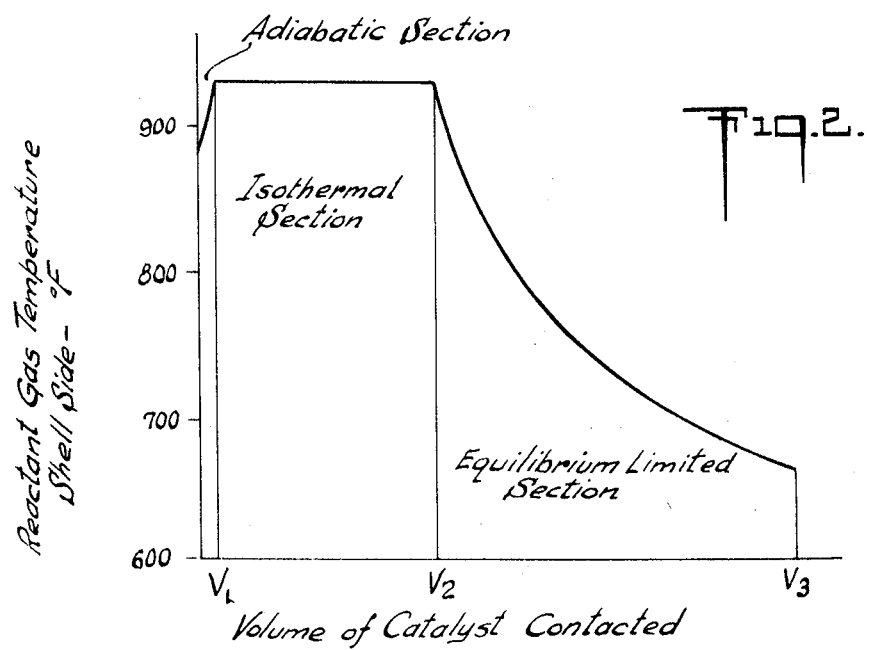

WATER-GAS SHIFT CONVERSION PROCESS

BACKGROUND OF THE INVENTION

1. Field of the Invention

This invention relates to a water-gas shift conversion process. In one of its more specific aspects, it relates to a process for producing synthesis gas rich in hydrogen from a CO-containing gaseous feed stream by an improved catalytic water-gas shift conversion process.

2. Description of the Prior Art

The catalytic water-gas shift conversion process is widely used for the manufacture of hydrogen, and ammonia synthesis gas. It is also commonly used in processes for producing feedstock streams of gaseous mixtures of hydrogen and carbon monoxide for use in the chemical synthesis of oxygen containing organic compounds.

The water-gas shift reaction is represented stoichiometrically as follows:

$$CO + H_2O = CO_2 + H_2 \qquad (1)$$

About 16,700 BTU's are liberated for each pound mole of CO converted. Heat removal and temperature control are therefore necessary to prevent destruction of the catalyst and to attain the desire CO conversion. Ordinarily, the reaction temperature is held in the range of 350° to 1,050° F. (depending upon the catalyst used) by employing two or three separate fixed beds of catalyst. The shifted gases from one bed may be passed through an external heat exchanger and cooled from a high temperature to a comparatively low temperature before being introduced into the next bed.

In such conventional systems the exit temperature from the last bed is not the minimum shifted gas temperature in the system, as it should be from ideal considerations for achieving maximum CO conversion. Further, reaction rates are slow at the beginning of each bed, since the bed temperature is lowest at that point. These disadvantages and others found with conventional shift converters are overcome by the process of my invention.

SUMMARY

This is a water-gas shift conversion process for producing a gaseous mixture of hydrogen and carbon dioxide from a CO-rich feed gas. Supplemental $H_2O$ is added to the feed gas and the feed gas mixture is then preheated while passing successively through a plurality of heat exchangers embedded in conventional shift catalyst contained in a reactor vessel. The preheated feed gas mixture is passed through catalyst in concurrent flow and in indirect heat exchange relationship with the feed gas mixture where it undergoes water-gas shift reaction. The aforesaid feed gas mixture flowing concurrently through the reactor inside the elements of the heat exchanges absorbs sensible heat from reactants undergoing catalytic shift reaction on the outside of the heat exchanger elements.

The temperature profile of the reactants passing through the shift converter in contact with the catalyst is thereby successively controlled through an adiabatic section where the temperature of the feed gases increase to a desired maximum, an isothermal section where said maximum temperature is maintained to achieve a rapid reaction rate, and an equilibrium-limited section where the temperature is reduced exponentially until the product gas leaves the shift converter at the desired CO conversion and desired minimum exit temperature. By the process of my invention, the volume of catalyst required for a given conversion of CO to $CO_2$ may be minimized.

It is therefore a principal object of the present invention to provide a continuous process for the production of a stream of hydrogen-rich gas from a CO containing gaseous feedstream.

Another object of this invention is to provide an improved water-gas shift conversion process which for a given CO conversion may be operated more efficiently than conventional fixed bed processes.

A still further object of this invention is to provide a continuous process by which carbon monoxide may be economically and efficiently utilized for the production of hydrogen.

These and other objects will be obvious to those skilled in the art from the following disclosure.

DESCRIPTION OF THE INVENTION

The present invention pertains to a novel continuous water-gas shift conversion process for reacting a CO-rich feed gas and $H_2O$ together to produce hydrogen and carbon dioxide. By this process, about 70 mole percent or more of the CO in the CO-rich feed gas may be converted to $CO_2$.

The process involves forming a CO-rich water-gas shift feedstream comprising carbon monoxide and steam, with or without liquid phase water. The shift feedstream, preferably at a temperature in the range of 350° to 620° F. and at a preferable mole ratio ($H_2O/CO$) in the range of about 2 to 5 is then introduced as a heat exchange fluid or coolant into the elements of the first of two successive heat exchangers.

The heat exchange elements are embedded in a water-gas shift catalyst, preferably contained in a single elongated cylindrical vessel. In the bed of catalyst there are temperature controlled sections referred to as the adiabatic, isothermal, and equilibrium-limited sections.

In the first heat exchanger, the shift feed stream is heated, preferably to a temperature in the range of about 400° to 780° F. and passed into and through a second heat exchanger as a coolant. Supplemental $H_2O$ may be added to the shift feedstream entering or leaving the second heat exchanger.

The shift feedstream leaves the second heat exchanger at a temperature preferably in the range of about 600° to 950° F. and is then passed up through said fixed bed of water-gas shift catalyst surrounding the aforesaid two heat exchange elements. As the shift feedstream passes through the reactor, the exothermic water-gas shift reaction takes place in the three successive temperature controlled sections i.e., adiabatic, isothermal, and equilibrium-limited.

In the adiabatic section of the catalyst bed, the temperature of the entering shift feedstream is quickly raised to the desired maximum operating temperature by the heat of reaction of the exothermic water-gas shift, i.e. the maximum temperature that the catalyst will withstand continuously without excessive loss of activity. The maximum temperature for conventional iron oxide-chromium oxide shift catalyst for example, is 930° F. The temperature may be controlled by such factors as space velocity, composition of shift feedstream, catalyst, and supplemental $H_2O$ added, as atomized liquid water or steam.

The reacting shift feedstream at a temperature in the range of 600° to 950° F. then passes through the catalyst surrounding the second heat exchange elements in the isothermal section. There, the temperature is held constant while the shift reaction continues until the rate of reaction is reduced to an unacceptable value by the changing displacement from equilibrium composition; a 50° F. approach to the apparent equilibrium temperature is a reasonable design value.

As the reacting gases leave the isothermal section and pass into the catalyst on the shell side of the first heat exchanger referred to as the equilibrium-limited section, the water-gas shift reaction continues at a reduced rate due to the lower temperature and reduced concentration of CO. The amount of CO conversion is facilitated in this last section before discharge by progressively lowering the temperature of the reactants along the length of the section as a function of CO concentration. At any specific point along the length of the equilibrium limited section, the actual temperature of the feed gas is held in the range of about 20°–160° F. and preferably 50° F. lower than the apparent equilibrium temperature corresponding to the equilibrium constant for the composition of the reacting feed gas at that point. The temperature of the product gas leaving the equilibrium-limited section, and discharged from the reactor, is preferably in the range of about 400° to 780° F.

The aforesaid first heat exchanger is located in the equilibrium-limited section requiring the greatest dissipation of heat. The shift feedstream at its lowest temperature enters the system at the beginning of the equilibrium-limited section and flows through the heat exchanger concurrent to the direction of flow of reactants in the reactor catalyst bed. Thus, the maximum temperature differences between the feedstream coolant and the catalyst bed is available at the region requiring the greatest heat flux, and the temperature difference decreases downstream just as does the required heat flux. Similarly, the largest temperature difference in the second heat exchanger located in the isothermal section is at the entrance where the heat flux requirement is greatest.

The heat transfer requirements in both the isothermal and the equilibrium-limited sections may be shown to be of an exponentially decreasing function versus length. These requirements are matched by indirect concurrent flow heat transfer between the gases undergoing water-gas shift reaction and a coolant. In the preferred embodiment of my invention the coolant comprises a continuous stream of comparatively cooler feed gas plus minor amounts of supplemental $H_2O$. Thus the feed gas mixture is heated by the reacting feed gas which it cools, at a decided economic advantage. A typical temperature profile for the gases undergoing shift reaction along the length of the shift converter is shown in FIG. 2 and will be discussed later with respect to the example.

In a preferred embodiment, the water-gas shift reaction takes place in a catalyst filled plug-flow shift converter comprising a vertical elongated cylindrical shaped pressure vessel or shell. The reaction takes place at a temperature in the range of about 250° to 1,500° F. and preferably in the range of 350° to 1,050° F., and a pressure in the range of about 1 to 350 atmospheres and preferably in the range of 10 to 200 atmospheres. Two separate heat exchangers embedded in catalyst are axially disposed within the shell of the shift converter. The heat exchangers divide the shift converter longitudinally into the three previously mentioned sections for controlling the temperature of the reacting feed gas. These sections are interconnected in series, and provide along the length of each section a predetermined temperature profile. Catalyst fills all of the space within the refractory lined shell that is not otherwise occupied by the heat exchangers. The pressure in all three sections is substantially the same, less normal minor pressure drop.

The flow of the reactants longitudinally through the reactor on the shell side of the heat exchangers is orderly with "non-backmix", i.e. no element of fluid overtaking any other element, also referred to as "plug flow". The residence time in the reactor is the same for all elements of the fluid.

Any suitable gas to gas heat exchanger may be used. For example, a suitable tubular heat exchanger is shown in FIG. 1 and will be further described. A preferred water-gas shift converter is depicted in coassigned copending application, Ser. No. 880,255 filed concurrently herewith.

The composition of the feed gas to the process may comprise from about 5 to 90 mole percent of CO on a dry gas basis and preferably 20 to 50 mole percent of CO on a dry gas basis. Feed gas to the process may be derived from any of the many well known gasification processes such as by the partial oxidation of a hydrocarbon fuel at a temperature in the range of 1,700° to 3,000° F. and a pressure in the range of 1 to 350 atmospheres. Other suitable feedstocks include water gas and the product gas from steam reforming hydrocarbons.

Conventional water-gas shift conversion catalysts may be employed in the process of our invention. For example, over a temperature range of about 600° to 1,050° F. a suitable catalyst comprises iron oxide promoted by 1 to 15 percent by weight of an oxide of a metal such as chromium, thorium, uranium, beryllium and antimony. This catalyst is characterized by heat stability (up to 1,184° F.), high activity, good selectivity, resistance to poisoning, constant volume, and long life. For low temperature shift reactions over a temperature range of about 350° to 650° F. the catalyst may comprise mixtures of copper and zinc salts or oxides in a weight ratio of about 3 parts zinc to 1 part copper. Catalyst may be obtained in the form of pellets or irregular fragments that range in size from about 5 to 10 mm. and larger, or tablets ranging from one-fourth in. to three-eighths inch in diameter.

DESCRIPTION OF THE DRAWING AND EXAMPLE

A more complete understanding of the invention may be had by reference to the accompanying drawing which depicts in FIG. 1 for a specific set of operating conditions and feed gas composition, a diagrammatic representation of a suitable shift converter in connection with a process flow diagram for one embodiment of the previously described process. In FIG. 2, a graphical representation is shown of the temperature profile of the reacting feed gas stream along the length of the shift converter.

Although the drawing illustrates a preferred embodiment of the process of this invention, it is not intended to limit the invention to the particular apparatus or materials described. Quantities have been assigned to the various streams so that the following description of the drawing also serves as an example of the invention.

Twenty-five million standard cubic feet per day (MMSCFD) of hydrogen are produced by the process of my invention in catalyst filled fixed bed water-gas shift converter 1, as shown in FIG. 1 of the drawing. Water-gas shift converter 1 functions as a plug flow reactor. The temperature profile of the reactant feed gas mixture passing longitudinally through the shell side of shift converter 1 and undergoing water-gas shift reaction is depicted in FIG. 2 of the drawing.

Water-gas shift converter 1 comprises a vertical steel pressure vessel 2 approximately 6½ feet in diameter by 38 feet high containing two separate but inter-connected axially aligned upper heat exchanger 3 and lower heat exchanger 4. As shown in the broken-away section of vessel 2, the space which is unoccupied by heat exchangers 3 and 4 is completely filled with conventional water-gas shift catalyst 5. The total amount of shift catalyst in this example comprises 626 cubic feet of a mixture of iron-oxide (85 to 95 weight percent) and chromium oxide (5 to 15 weight percent). The catalyst is in the form of pellets three-eighths inch diameter by three-tenths inch thick and is supported off the bottom of vessel 2 by perforated plate 6.

Although not shown in the drawing, pressure vessel 2 is jacketed with a suitable thermal insulation e.g. rock wool or diatomacious silica plus asbestos fiber so as to reduce heat loss to a negligible quantity.

Upper heat exchanger 3 in this example has a total area of approximately 4,500 square feet and comprises a bundle of 960 vertical and parallel alloy steel tubes 7. Each tube has an inside diameter of 1.032 inches, a wall thickness of 0.109 inches and a length of 17 feet. Tubes 7 are fed by lower header 8 and discharge into upper header 9.

Lower heat exchanger 4 in this example is similar in design to upper heat exchanger 3 but has a total area of approximately 3,200 square feet and comprises a bundle of 960 vertical and parallel alloy steel tubes 10. Each tube has an inside diameter of 1.032 inches, a wall thickness of 0.109 inches, and a length of 12 feet. Tubes 10 are fed by header 11 and discharge into header 12.

For temperature control, water-gas shift converter 1 may be considered as being divided into three sections respectively called adiabatic, isothermal and equilibrium-limited. The adiabatic section comprises the space bounded by perforated catalyst support plate 6 and header 11 and has a volume of catalyst $V_1$. The isothermal section comprises the space occupied by heat exchanger 4 and has a volume of catalyst $V_2-V_1$. The equilibrium-limited section comprises the space occupied by heat exchanger 3 and has a volume of catalyst $V_3-V_2$. Further, the volumetric relationship between these three sections in this example is approximately as follows:

$$V_1 : V_2-V_1 : V_3-V_2 = 1 : 17 : 24$$

29.3 million standard cubic feet per day (MMSCFD) of a dry gas feed stream in line 13 at a temperature of 411° F. and a pressure of 510 psig and having the composition as shown in Table 1 are mixed in line 14 with 67.7 million pounds per day of liquid water from line 15 at a temperature of 411° F. and a pressure of 600 psig.

The feed gas-water mixture in line 14 at a temperature of 411° F. is introduced into lower header 8 of upper heat exchanger 3. As the feed gas-water mixture flows up through tubes 7 and into upper header 9 it comes in noncontact concurrent indirect heat exchange with partially shifted gas which enters the catalyst filled shell side of heat exchanger 3 from the shell side of the isothermal section below at a temperature of about 930° F. and which then passes up through the shell side of the equilibrium-limited section.

The temperature of the feed gas-water mixture in tubes 7 increases exponentially as it passes up through heat exchanger 3 by absorbing the heat from the reactant gases undergoing water-gas shift reaction on the shell side of heat exchanger 3. This heat comprises the sensible heat in the reactant gases and the heat released by the exothermic shift reaction. Vaporization of the atomized liquid water in the feed gas mixture within the tubes of the heat exchanger effectively reduces the temperature of the reactant gases in the initial portion of the equilibrium-limited section where the highest heat flux is desired. The temperature of the reacting gases are reduced exponentially as they pass through the equilibrium-limited section.

The preheated feed gas is removed at a temperature of 660°F. from header 9 of heat exchanger 3 through line 16 near the top of shift converter 1. Simultaneously, the cooled shifted product gas is removed from shift converter 1 through line 17 at the top of the column. An analysis of the shifted product gas is shown in Table 1.

Supplementary $H_2O$ is available in line 18 for addition to the feed gas in line 16 so as to provide temperature control. However, in this example no additional $H_2O$ is required at this point. The feed gas mixture in line 19 at a temperature of 660°F. is introduced into lower header 11 of heat exchanger 4. As the feed gas mixture flows up through tubes 10 and into upper header 12, it comes in noncontact concurrent indirect heat exchange with partially shifted reactant gas which enters the catalyst filled shell side of heat exchanger 4 from the catalyst filled adiabatic section below at a temperature of about 930° F. The partially shifted reactant gas then passes up through the shell side of the isothermal section undergoing water-gas shift reaction.

The temperature of the feed gas in tubes 10 increases exponentially as it passes up through heat exchanger 4 by absorbing the sensible heat from the concurrent reactant gases on the shell side of heat exchanger 4 as well as by absorbing heat released by the exothermic catalytic shift reaction taking place on the shell side. The temperature of the gas undergoing shift reaction in the isothermal section is held constant.

The preheated feed gas as humidified by $H_2O$ additions is then removed from heat exchanger 4 through line 20 at a specified temperature of about 880° F. and is introduced into the shell side of shift converter 1 below perforated catalyst support plate 6 by way of line 21. Supplementary $H_2O$ is available in line 22 for addition to the feed gas in line 20 so as to provide temperature control. However, in this example no additional water is required at this point. As the reactant feed gas passes up through the catalyst filled adiabatic section its temperature is increased exponentially to 930° F. by the heat of reaction from the water-gas shift reaction. The volume of catalyst and the composition and inlet temperature of the reactant feed gas helps to control the maximum temperature in the adiabatic section to 930° F. Destruction of the catalyst is thereby prevented.

A summary of the operating characteristics and the composition of the streams are shown in Table I along with for comparison in Table II the values for a conventional water-gas shift converter utilizing three fixed beds of catalyst and interbed cooling to process the same quantity of feed gas at the same CO conversion.

From Tables I and II it is apparent that in comparison with conventional process, by the process of my invention the same quantity of product gas can be produced having the same analysis but employing in the process about one-third of the catalyst and about one-third of the water. This means that the size of the shift converter may be reduced about 64 percent, at a significant economic savings in catalyst and equipment.

The process of the invention has been described generally and by examples, with reference to materials of particular composition for purposes of clarity and illustration only. It will be apparent to those skilled in the art from the foregoing that various modifications of the process and materials disclosed herein can be made without departure from the spirit of the invention.

TABLE I.—SHIFT CONVERSION PROCESS AS SHOWN IN FIG. I

| | Feed gas (line 13) | Feed gas plus $H_2O$ (line 14) | Feed gas (line 19) | Feed gas at inlet to adiabatic section | Reactant gas from adiabatic section | Reactant gas from isothermal section | Product from equilibrium limited section | Overall |
|---|---|---|---|---|---|---|---|---|
| Reactor volume, cu. ft | | | | | | | | 1,240 |
| Catalyst volume, cu. ft | | | | | 15 | 254 | 357 | 626 |
| Temperature, °F | 411 | 411 | 660 | 880 | 930 | 930 | 675 | |
| Pressure, p.s.i.g | 515 | 515 | 512 | 510 | | | 465 | |
| Gas composition, mole percent feed, dry basis: | | | | | | | | |
| CO | 48.7 | 48.7 | 48.7 | 48.7 | 43.0 | 11.2 | 4.7 | |
| $CO_2$ | 3.8 | 3.8 | 3.8 | 3.8 | 9.5 | 41.4 | 47.9 | |
| $H_2$ | 45.8 | 45.8 | 45.8 | 45.8 | 51.5 | 83.3 | 89.8 | |
| Inerts | 1.7 | 1.7 | 1.7 | 1.7 | 1.7 | 1.7 | 1.7 | |
| $H_2O$ | 115.0 | 127.8 | 127.8 | 127.8 | 122.1 | 90.2 | 83.7 | |
| $H_2O$/CO mole ratio | 2.4 | 2.6 | 2.6 | 2.6 | 2.8 | 8.1 | 17.8 | |
| $H_2O$ added, percent mole dry feed | | 12.8 | | | | | | 12.8 |
| Space velocity, s.c.f.h. dry feed/ft.³ cat | | | | | 78,100 | 4,760 | 3,390 | 1,890 |
| Conversion, percent mole CO in dry feed | | | | | 11.7 | 77.1 | 90.4 | 90.4 |

TABLE II.—CONVENTIONAL SHIFT CONVERSION PROCESS

| | Feed | Inlet 1st bed | Outlet 1st bed | Inlet 2nd bed | Outlet 2nd bed | Inlet 3rd bed | Product gas | Overall |
|---|---|---|---|---|---|---|---|---|
| Reactor volume, cu. ft | | | | | | | | 3,390 |
| Catalyst volume, cu. ft | | 240 | | 430 | | 1,182 | | 1,852 |
| Temperature, °F | 411 | 708 | 930 | 786 | 899 | 722 | 486 | |
| Pressure, p.s.i.g | 510 | 501 | | | | | | |
| Gas composition, mole percent feed, dry basis: | | | | | | | | |
| CO | 48.7 | 48.7 | 23.3 | 23.3 | 9.1 | 9.1 | 4.7 | |
| $CO_2$ | 3.8 | 3.8 | 29.2 | 29.2 | 43.4 | 43.4 | 47.8 | |
| $H_2$ | 45.8 | 45.8 | 71.2 | 71.2 | 85.4 | 85.3 | 89.8 | |
| Inerts | 1.7 | 1.7 | 1.7 | 1.7 | 1.7 | 1.7 | 1.7 | |
| $H_2O$ | 115.0 | 115.0 | 89.6 | 105.1 | 90.9 | 111.7 | 107.3 | |
| $H_2O$/CO mole ratio | 2.4 | 2.4 | 3.9 | 4.5 | 10.0 | 12.3 | 23.0 | |
| $H_2O$ added, percent mole dry feed | | | 15.5 | | 20.8 | | | 36.3 |
| Space velocity, s.c.f.h. dry feed/ft.³ cat | | | 5,020 | | 2,815 | | 1,024 | 653 |
| Conversion, percent mole CO in dry feed | | | 52.2 | | 81.3 | | 90.4 | 90.4 |

I claim:
1. A water-gas shift conversion process comprising
   1. preheating a gaseous stream comprising a CO-rich gas and $H_2O$ by passing said gaseous stream as a coolant successively through first and second heat exchange units embedded in an equilibrium-limited section and an isothermal section respectively of a water-gas shift conversion zone, both sections containing water-gas shift catalyst;
   2. partially reacting the preheated gaseous stream from (1) at a temperature in the range of about 250° to 1,500° F. over water-gas shift catalyst in an adiabatic section of said water-gas shift conversion zone to produce hydrogen and carbon dioxide;
   3. introducing the partially reacted gaseous stream from (2) at substantially the same exit temperature as from (2) into the water-gas shift catalyst in said isothermal section in (1), continuing the exothermic water-gas shift reaction of said gaseous stream as it is passed longitudinally through said isothermal section, and keeping the temperature of said reaction gaseous stream substantially constant by concurrent indirect heat exchange with said gaseous coolant in (1), thereby preheating said gaseous coolant stream as described previously in (1); 4. introducing the partially reacted gaseous stream from (3) at substantially the same exit temperature as from (3) into the water-gas shift catalyst in the equilibrium-limited section in (1), continuing the exothermic water-gas shift reaction of said gaseous stream as it is passed longitudinally through said equilibrium-limited section in (1), and gradually reducing the temperature of said gaseous stream by concurrent indirect heat exchange with said gaseous coolant stream in (1) as described previously; and 5. removing the reacted gaseous stream from (4) as shifted product gas containing an increased amount of hydrogen.

2. The process of claim 1 wherein the pressure in the adiabatic, isothermal, and equilibrium-limited sections of the water-gas shift conversion zone is substantially the same, less ordinary pressure drop across the catalyst beds, and is in the range of about 1 to 350 atmospheres.

3. The process of claim 1 further provided with the step of admixing supplemental $H_2O$ with the preheated gaseous stream leaving the equilibrium-limited section in step (1).

4. The process of claim 1 further provided with the step of admixing supplemental $H_2O$ with the preheated gaseous stream leaving the isothermal section in step (1).

5. The process of claim 1 wherein said water-gas shift catalyst is selected from the group of catalysts consisting of iron oxide promoted by 1 to 15 percent by weight of an oxide of a metal such as chromium, thorium, uranium, beryllium and antimony; and a catalyst mixture of copper and zinc oxides in a weight ratio of about 3 parts zinc to 1 part copper.

6. A water-gas shift conversion process at a pressure in the range of 1 to 350 atmospheres comprising: 1. introducing a stream of feed gas mixture comprising a CO-rich gas and $H_2O$ as a coolant into the first section of a three sectional shift conversion zone containing water-gas shift catalyst and heating said feed gas mixture to a temperature in the range of about 400° to 780° F. by indirect heat exchange in said first section with a concurrent stream of partially shifted effluent gas which was introduced from the second section of said water gas shift conversion zone and which is simultaneously undergoing catalytic water-gas shift reaction in said first section, and discharging the shifted effluent gas from said first section as a product gas stream comprising hydrogen and carbon dioxide at a temperature in the range of about 400° to 780° F.; 2. passing the stream of feed gas mixture coolant preheated in the first section of said shift conversion zone in step (1) through the second section of said catalytic water-gas shift conversion zone in indirect heat exchange with a concurrent stream of partially shifted effluent reactant gas which was introduced from the third section of said water-gas shift conversion zone and which is simultaneously undergoing catalytic water-gas shift reaction in said second section; 3. introducing the stream of feed gas mixture coolant preheated in the second section of said shift conversion zone in step (2) to a temperature in the range of about 600° to 950° F. into the third section of said water-gas shift conversion zone to contact said water-gas shift catalyst, subjecting said feed gas mixture to catalytic water-gas shift reaction, and discharging the shifted effluent reactant gas from said third section into said second section of said shift conversion zone as said partially shifted effluent reactant gas in step (2).

7. The process of claim 6 further provided with the steps of admixing supplemental $H_2O$ with the preheated feed gas mixture leaving step (1).

8. The process of claim 6 wherein the pressure in all three sections of the catalytic water-gas shift conversion zone is substantially the same, less normal minor pressure drop.

9. The process of claim 6 where in step (1) said stream of feed gas mixture is introduced into said first section at a temperature in the range of 350° to 620° F. and with a mole ratio ($H_2O/CO$) in the range of about 2 to 5.

10. The process of claim 6 with the additional step of adding a minor amount of $H_2O$ to the feed gas coolant mixture removed from said second section in step (2) before introducing said feed gas mixture into said third section of said water-gas shift conversion zone in step (3).

* * * * *